US012730675B2

(12) United States Patent
Pack, III et al.

(10) Patent No.: US 12,730,675 B2
(45) Date of Patent: Sep. 8, 2026

(54) AUTOMATION WITH COMPOSABLE ASYNCHRONOUS TASKS

(71) Applicant: Salesforce, Inc., San Francisco, CA (US)

(72) Inventors: Richard Perry Pack, III, San Francisco, CA (US); Michael Triantafelow, Raleigh, NC (US); Dean Moses, San Francisco, CA (US); Caridy Patino, Miami, FL (US); Adheip Varadarajan, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 432 days.

(21) Appl. No.: 18/243,387

(22) Filed: Sep. 7, 2023

(65) Prior Publication Data

US 2025/0086011 A1 Mar. 13, 2025

(51) Int. Cl.
*G06F 9/50* (2006.01)

(52) U.S. Cl.
CPC .................................. *G06F 9/5005* (2013.01)

(58) Field of Classification Search
CPC ..................................................... G06F 9/5005
See application file for complete search history.

(56) References Cited

U.S. PATENT DOCUMENTS 10,860,373 B2 * 12/2020 Akella .................. G06F 9/4881
2024/0354567 A1 * 10/2024 Duggal .................. G06N 3/006
2025/0013437 A1 * 1/2025 Vidan ....................... G06F 8/33

FOREIGN PATENT DOCUMENTS

WO WO-2024175935 A1 * 8/2024 ............... G09B 7/02

OTHER PUBLICATIONS

Lukas Ziarek, KC Sivaramakrishnan, Suresh Jagannathan, Composable Asynchronous Events, Purdue University, PLDI'11, Jun. 4 -8, 2011. (Year: 2011).*

* cited by examiner

*Primary Examiner* — Kurtis Gills
(74) *Attorney, Agent, or Firm* — Butzel Long

(57) ABSTRACT

Systems, devices, and techniques are disclosed for automation with composable asynchronous tasks. A prompt may be received at a computing device. Using a first large language model (LLM) composable asynchronous tasks may be determined from the prompt. One of the composable asynchronous tasks may use a second LLM. The composable asynchronous tasks may be performed. Performing one of the composable asynchronous tasks may include generating a first output with the second LLM based on the prompt and validating the first output of the LLM. Performing another of the composable asynchronous tasks may include generating a second output using the first output.

20 Claims, 6 Drawing Sheets

300

301

302

303

304

305

```
// codeGenerationTask.mjs
import { queryLLM } from './llmInterface.mjs';
import { lintAndFormat } from './lintAndFormatTask.mjs';
import { generateTests } from './generateTestsTask.mjs';
export const metadata = {
        name: 'Code Generation Task',
        description: 'Generates code using an LLM with sub-tasks',
};

export async function execute({ prompt, lintConfig, testsConfig
}) {

        // Query the LLM to generate code
        const generatedCode = await queryLLM(prompt);

        // Lint and format the generated code
        const formattedCode = await lintAndFormat({
                code: generatedCode,
                config: lintConfig,
        });

        // Generate tests for the generated code
        const generatedTests = await generateTests({
                code: formattedCode,
                config: testsConfig,
        });

        return {
                code: formattedCode,
                tests: generatedTests,
        };
}
```

Fig. 3

Client 10

Server 13

Client 11

Network 7

Database 15

Remote Platform 17

AUTOMATION WITH COMPOSABLE ASYNCHRONOUS TASKS

BACKGROUND

Large Language Models (LLMs) may be used to generate coherent and contextually relevant text based on input prompts. However, LLMs are subject to token limits, output inconsistency, and difficulty in recovering from errors, that may hinder their usage in various areas, including in software development. The maximum token limit of an LLM may restrict the amount of input and output data that can be processed by the LLM in a single interaction, making it difficult for the LLM to handle complex problems with extensive requirements or large codebases. It may be difficult to ensure that output generated by an LLM is consistent and adheres to best practices or specific coding guidelines. When an LLM produces incorrect or suboptimal output, it may be hard to identify and recover from the error as the output may not adhere to a standard which may make it difficult to trace the source of the problem. Integrating LLM-generated outputs with traditional software systems may also be difficult due to differing design philosophies and execution models.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 3 shows an example arrangement suitable for automation with composable asynchronous tasks according to an implementation of the disclosed subject matter.

DETAILED DESCRIPTION

Figure 1:
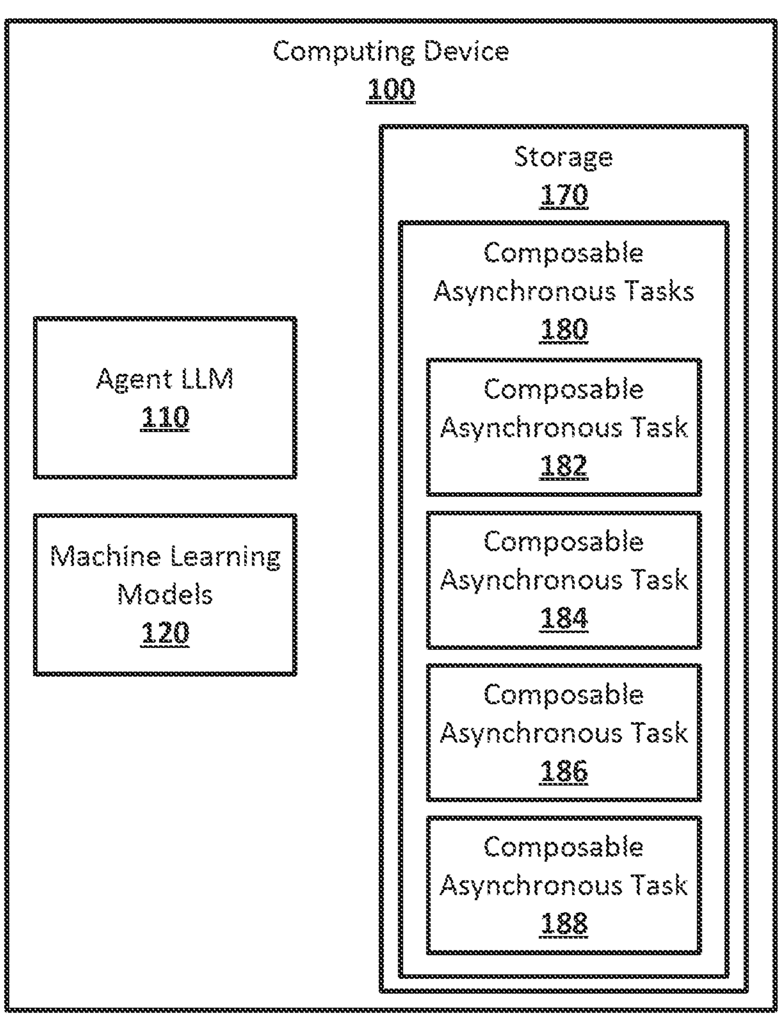
FIG. 1 shows an example system suitable for automation with composable asynchronous tasks according to an implementation of the disclosed subject matter.

Techniques disclosed herein enable automation with composable asynchronous tasks, which may allow for larger jobs to be decomposed into and accomplished with composable asynchronous tasks that use large language models (LLMs) and Generative Pretrained Transformers (GPTs). A prompt input by a user may be received. An agent LLM may be used to determine, from the prompt, tasks, including a first composable asynchronous task that uses a second LLM. The composable asynchronous tasks may be performed. Performing one of the composable asynchronous tasks may include generating a first output with the second LLM based on the prompt and validating the first output of the LLM. Performing another of the composable asynchronous tasks may include generating a second output using the first output.

A prompt may be received. Using any suitable input device, a user may input a prompt to a computing device. The prompt input by the user may be text written in plain, human understandable language, that includes a request for which responsive output may be generated using composable asynchronous tasks. The request may be a job to be accomplished, for example, a request for the generation of computer code for a website, application, web application, or website component that includes certain features specified in the prompt, a request for the generation of data of a specific type, such as product descriptions for product in a database, or a request for the generation of any other suitable data type. The prompt may be phrased in any suitable manner. For example, a user may input a prompt requesting the generation of a gallery user interface component for use within web applications. Prompts may also be generated automatically, for example, by other applications running on any suitable computing devices.

An agent LLM may be used to determine, from the prompt, composable asynchronous tasks, including a first composable asynchronous task that uses a second LLM. The agent LLM may be an LLM trained in any suitable manner running on any suitable computing device. The agent LLM may receive the prompt input by the user and determine composable asynchronous tasks that may be used to generate output that is responsive to the request presented in the prompt. The agent LLM may select these determined composable asynchronous tasks. The agent LLM may, for example, decompose the job posed by the prompt input by the user into several smaller jobs, and then may determine and select composable asynchronous tasks that can accomplish these smaller jobs from a variety of composable asynchronous tasks available to the agent LLM. The agent LLM may decompose the prompt into any number of tasks and may generate text-based prompts to be input into LLMs used by any of the selected composable asynchronous tasks, as well as appropriate inputs for any other selected composable asynchronous tasks. The agent LLM may be trained to decompose received prompts and determine and select composable asynchronous tasks to generate output responsive the request in the prompt rather than attempting to generate this output on its own. For example, if output responsive to the request in a prompt received by the agent LLM is computer code, the agent LLM may not generate any computer code itself, and may instead output computer code generated by the composable asynchronous tasks selected by the agent LLM. These composable asynchronous tasks may themselves use LLMs, GPTs, or other generative machine learning models to generate the computer code that will be ultimately be output by the agent LLM.

The agent LLM may select from among any number of composable asynchronous tasks to accomplish the smaller jobs into which the agent LLM has decomposed a prompt. Each composable asynchronous task may be self-contained with well-defined and structured input and output. For example, a composable asynchronous task that incorporates an LLM may accept a prompt for the LLM as input and may generate computer code in a specified programming language as output. The prompt may be a prewritten statement with blanks that may be filled in by the agent LLM when using the composable asynchronous task. The composable asynchronous tasks may be modular and reusable and may be executable both serially and in parallel, subject to dependencies on the output from other composable asynchronous tasks. The composable asynchronous tasks may incorporate any suitable tools that may accept any suitable input and produce and suitable output and may include any suitable number of sub-tasks each of which may itself use any suitable tools. Tools used by a composable asynchronous task may include, for example, LLMs, GPTs, Generative Adversarial Networks (GANs), other forms of machine learning models, and other programs, applications, or utilities. Composable asynchronous tasks may include any number of sub-tasks, including, for example, sub-tasks, for generating potential output for the composable asynchronous task using any suitable tool, sub-tasks for validating and error-checking the potential output, sub-tasks for generating and running tests on the potential output, and sub-tasks for error recovery. Sub-tasks with a composable asynchronous tasks may be other composable asynchronous tasks.

The agent LLM may, for example, decompose the prompt requesting the generation of a gallery user interface component for use within web applications into smaller jobs and may then determine and select several composable asynchronous tasks that may be used to accomplish the smaller jobs and generate output responsive to the request in the prompt. The agent LLM may generate prompts and inputs appropriate for any LLMs, GPTs, or GANs, used as tools by the identified composable asynchronous tasks. Prompts generated by the agent LLM for input to a composable asynchronous task may be sub-prompts. A first composable asynchronous task may be, for example, a composable asynchronous task that may generate a gallery container component for the gallery user interface component using an LLM that accepts as input a prompt in a defined format for requesting the generation of web application components and outputs the code for the web application component requested in the prompt along with documentation of the web application component. A second composable asynchronous task may be, for example, a composable asynchronous task that may generate a gallery item component for the gallery user interface component using an LLM that accepts as input a prompt in a defined format for requesting the generation of web application components and outputs the code for the web application component requested in the prompt along with documentation of the web application component. A third composable asynchronous task may be, for example, a composable asynchronous task that may generate a gallery image component for the gallery user interface component using an LLM that accepts as input a prompt in a defined format for requesting the generation of web application components and outputs the code for the web application component requested in the prompt along with documentation of the web application component. A fourth composable asynchronous task may be, for example, a composable asynchronous task that may compose the gallery user interface component from the gallery container component, the gallery item component, and the gallery image component using an LLM and may output the completed gallery user interface component, for example, as computer code in any suitable programming language, such as a programming language that was included in the prompt received by the agent LLM. The completed gallery user interface component and documentation may be returned by the agent LLM as the response to the initial prompt that was input to the agent LLM. The first, second, and third composable asynchronous tasks may all run asynchronously, while the fourth composable asynchronous tasks may wait due to its dependency on the outputs of the first, second, and third composable asynchronous tasks.

For example, the LLM used by first composable asynchronous task may generate computer code for the gallery container component in any suitable programming language and format, for example, as specified in a prompt input to the LLM used by first composable asynchronous task by the agent LLM. The first composable asynchronous task may call the LLM using a sub-prompt received from the agent LLM. The first composable asynchronous task may include several sub-tasks. A first sub-task of the first composable asynchronous task may lint the generated gallery container component, a second sub-task may use an LLM to generate tests that can be run on the generated gallery container component and may lint the test, a third sub-task may execute the tests on the generated gallery container component, and a fourth sub-task may generate documentation for the generated gallery container component. The first composable asynchronous task may re-run itself, regenerating the gallery container component, if gallery container component fails any of the tests generated by the second sub-task and used by the third sub-task. When re-running itself, the first composable asynchronous task may change the prompt input to the LLM that generates the gallery container component, for example, including an indication of the test that was failed by the previously generated gallery container component.

The LLM used by second composable asynchronous task may generate computer code for the gallery item component in any suitable programming language and format, for example, as specified in a prompt input to the LLM used by second composable asynchronous task by the agent LLM. The second composable asynchronous task may call the LLM using a sub-prompt received from the agent LLM. The second composable asynchronous task may include several sub-tasks. A first sub-task of the second composable asynchronous task may lint the generated gallery item component, a second sub-task may use an LLM to generate tests that can be run on the generated gallery item component and may lint the test, a third sub-task may execute the tests on the generated gallery item component, and a fourth sub-task may generate documentation for the generated gallery item component. The second composable asynchronous task may re-run itself, regenerating the gallery item component, if gallery item component fails any of the tests generated by the second sub-task and used by the third sub-task. When re-running itself, the second composable asynchronous task may change the prompt input to the LLM that generates the gallery item component, for example, including an indication of the test that was failed by the previously generated gallery item component.

The LLM used by third composable asynchronous task may generate computer code for the gallery image component in any suitable programming language and format, for example, as specified in a prompt input to the LLM used by third composable asynchronous task by the agent LLM. The third composable asynchronous task may call the LLM using a sub-prompt received from the agent LLM. The third composable asynchronous task may include several sub-tasks. A first sub-task of the third composable asynchronous task may lint the generated gallery image component, a second sub-task may use an LLM to generate tests that can be run on the generated gallery image component and may lint the test, a third sub-task may execute the tests on the generated gallery image component, and a fourth sub-task may generate documentation for the generated gallery image component. The third composable asynchronous task may re-run itself, regenerating the gallery image component, if gallery image component fails any of the tests generated by the second sub-task and used by the third sub-task. When re-running itself, the third composable asynchronous task may change the prompt input to the LLM that generates the gallery image component, for example, including an indication of the test that was failed by the previously generated gallery image component.

The LLM used by fourth composable asynchronous task may compose the gallery user interface component using the computer code for the gallery container component, the gallery item component, and the gallery image component generated and output by the first, second, and third composable asynchronous tasks. The agent LLM may use the computer code for the gallery container component, the gallery item component, and the gallery image component as input to the LLM used by fourth composable asynchronous task as part of a prompt that instructs the LLM used by fourth composable asynchronous task to compose the gallery user interface component. The fourth composable asynchronous task may call the LLM using a sub-prompt received from the agent LLM. The fourth composable asynchronous task may include first sub-task that may lint the gallery user interface component generated by the LLM used by fourth composable asynchronous task. The fourth composable asynchronous task may include a second sub-task that may to generate tests that can be run on the gallery user interface component. The output of the fourth composable asynchronous task, including both the gallery user interface component and the tests generated to be run on the gallery user interface component, may be returned to a user as output by the agent LLM in response to the prompt input by the user to the agent LLM. The user may use the gallery user interface component and tests in any suitable manner. The fourth composable asynchronous task may also include a third sub-task that may execute the tests gallery user interface component. If the gallery user interface component fails any of the tests, the fourth composable asynchronous task may return a report of the failure to the agent LLM, which may rerun all of the composable asynchronous tasks to regenerate the gallery user interface component. When re-running the composable asynchronous tasks, the agent LLM may change any of the prompts input to any of the LLMs of any of the composable asynchronous tasks that generate, for example, including an indication of the test that was failed by the previously generated gallery user interface component.

Performing one of the composable asynchronous tasks may include generating a first output with the second LLM based on the prompt and validating the first output of the LLM. For example, the agent LLM may input a prompt, generated by the agent LLM based on the prompt received by the agent LLM, into a first composable asynchronous task selected by the agent LLM. The first composable asynchronous task may use an LLM, such as, for example, an LLM that may be used to generate computer code. The LLM used by first composable asynchronous task may generate output, for example, computer code, according to the prompt received as input from the agent LLM. The output of the LLM used by first composable asynchronous task may be validated in any suitable manner for the type of the output. For example, output that is computer code may be validated by running any suitable number of tests on the computer code as written, or by texting the execution of the computer code. Other outputs that may be generated by a composable asynchronous task may include, for example, images, texts, and data sets.

Performing another of the composable asynchronous tasks may include generating a second output using the first output. For example, the agent LLM may use the output of one of the selected composable asynchronous tasks as input for another of the selected composable asynchronous tasks. The agent LLM may use any number of outputs from any number of selected composable asynchronous tasks as input into any other selected tasks. As each of the composable asynchronous tasks may have both clearly defined inputs and outputs, the agent LLM may be able to determine which composable asynchronous tasks will accept as input the output of other composable asynchronous tasks.

The first output generated by a first composable asynchronous task may be computer code for a component of an application. In some instances, the prompt input by the user to the agent LLM may request the generation of an application or other software component, such as the gallery user interface component. The output generated by composable asynchronous tasks selected by the agent LLM may be computer code that may used to implement the requested application or software component, or a portion or component thereof. The computer code may be generated by the composable asynchronous task in any suitable manner, including using any suitable LLM, in any suitable format and programming language. Before outputting generated computer code, the code may be validated, for example, by a sub-task may lint and test the computer code. Computer code generated by tasks selected by an agent LLM may be combined by another task selected by the agent LLM into the requested application or software component, which may then be tested by the agent LLM before being returned as output to the user.

Output from both a composable asynchronous task selected by the agent LLM and from the agent LLM may be validated in any suitable manner. For example, sub-tasks may generate and perform tests on the potential output of a composable asynchronous task before it is output by the composable asynchronous task. The test generated by a sub-task may be suitable for testing the potential output of the composable asynchronous task. For example, tests generated to test output that is computer code may be syntax tests for the programming language of the computer code, security tests, and other debugging tests including input and output validation.

When potential output from a composable asynchronous task, or the agent LLM, fails a test, the output may be regenerated. For example, if computer code generated by a composable asynchronous task fails tests run against it in a sub-composable asynchronous task, the composable asynchronous task may regenerate the computer code. A composable asynchronous task that regenerates an output may use the same inputs that were used to generate the potential output that failed testing, for example, the same prompt that was input to the composable asynchronous task by the agent LLM. The input used to regenerate the output may also be modified based on the test that potential output failed. For example, after computer code generated by the LLM of a composable asynchronous task fails a test, the prompt input to the composable asynchronous task may be modified to indicate which test the computer code failed, which may allow the LLM to generate computer code that does not fail that test. A composable asynchronous task may regenerate its output any number of times, until the output passes all tests run on it, before the output is output from the composable asynchronous task. In some implementations, a composable asynchronous task, or the agent LLM, may notify a user when potential output fails a test, allowing for manual intervention.

The agent LLM may select the same composable asynchronous task any number of times for use in responding to a prompt. For example, a composable asynchronous task that uses an LLM to generate computer code may be selected multiple times by an agent LLM to generate output in response to a prompt requesting the generation of a software application or component thereof. The agent LLM may cause different instances of the composable asynchronous task that was selected multiple times to run, and may input a different prompt into each instance of the composable asynchronous task. For example, the composable asynchronous task that uses and LLM to generate a gallery container component and the composable asynchronous task that uses and LLM to generate a gallery item component may be different instances of the same composable asynchronous task using the same LLM, into which the agent LLM may input different prompts in order to cause the different instances of the composable asynchronous task to generate the different components.

The input to and output from the composable asynchronous tasks, and of the agent LLM, may be compatible with traditional software development processes and tools. This may allow the agent LLM and composable asynchronous tasks to be inserted into traditional software development workflows.

The use of composable asynchronous tasks may allow for separation between the LLMs used and APIs, filesystems, and the Internet. The agent LLM may respond to a prompt through the use of composable asynchronous tasks, which in turn may use LLMs that may not interact with external systems. The output of the agent LLM may be interpreted and processed through traditional, non-LLM, software composable asynchronous tasks that may interact with external systems as needed. This may eliminate the risks involved with allowing LLMs to directly interact with externals systems, such as APIs, filesystems, and the Internet.

Decomposing lager tasks, for example, as presented by prompts input to an agent LLM, into several different composable asynchronous tasks, each of which may handle a portion of the larger job, may allow for better handling of token limits that are LLMs are subject to. Composable asynchronous tasks may also be rearranged, modified, or replaced, independently of each other, providing greater adaptability to changing requirements or evolving technologies. Because the composable asynchronous tasks may each be executed, verified, and validated independently or in sequence, error recovery may be more efficient, as an error in a particular composable asynchronous task may not affect the output of other composable asynchronous tasks, and composable asynchronous tasks that do rely on the output of other composable asynchronous tasks may not run until the error in the output of any other composable asynchronous tasks has been corrected, preventing that composable asynchronous task from also generating erroneous output and having to be rerun. Composable asynchronous tasks may facilitate integration between LLM output and traditional software systems.

The use of composable asynchronous tasks to generate outputs based on different portions of a larger job, rather than having a single task generate output based on the entire larger job, may allow the composable asynchronous tasks to be more specific tasks. This may allow for the composable asynchronous tasks to be provided, for example, by the agent LLM, with richer prompts with greater context, resulting in more concise and targeted output. This is may be useful when the larger job involves generating computer code or other structured content.

For example, a composable asynchronous task may be generated to handle the generation of product descriptions for an e-commerce website. The input data for this composable asynchronous task may include product attributes such as product name, category, features, and pricing information. The desired output format for output from the composable asynchronous task may be, for example, products descriptions for each product that follows a consistent structure, such as, for example, starting with a headline followed by a brief overview of the product, and then a detailed list of features and benefits of the product. A prompt for use as input to an LLM used by composable asynchronous task may be generated to include the input data and instructions to the LLM to generate a product description following the desired output format. This prompt may be structured so that it may accept data, such as the input data including product attributes such as product name, category, features, and pricing information, from an agent LLM. For example, the agent LLM may insert into the prompt a pointer to a file folder, file, or website that includes the input data. The reliability of the product descriptions generated by the LLM used by composable asynchronous tasks, a sub-task that validates the output of the LLM may be added to the composable asynchronous task. This sub-task may use another LLM, a rule-based system, or a combination of both to ensure that the generated product descriptions adhere to the desired output format, include all relevant information from the input data, and are free of errors or inconsistencies. This may ensure higher quality output from the composable asynchronous task.

Composable asynchronous tasks may allow for control over execution flow. The composable asynchronous tasks selected by an agent LLM may be executed in parallel, sequentially, or conditionally, depending on the requirements and constraints of the problem in the prompt input to the agent LLM.

Composable asynchronous tasks may be interacted with any suitable manner. For example, composable asynchronous tasks may include APIs for both input and output. The APIs may define the nature of structure of both the input and the output from a composable asynchronous task, allowing for increased compatibility with existing software architectures, such as environments used for software development.

Composable asynchronous tasks may have any suitable level of granularity, which may allow for larger jobs to be decomposed into any number of composable asynchronous tasks which each may be responsible for and suitable portion of the larger job. Composable asynchronous tasks may be generated in any suitable format using any programming language and structure and may be targeted at any suitable execution environment.

Composable asynchronous tasks may be used to test other composable asynchronous tasks. For example, a testing pipeline may call a target composable asynchronous task with a known input for which there is reference output. Output from LLMs, including those used within composable asynchronous tasks, can vary, so output from the composable asynchronous task based on the known input cannot be directly compared with the reference output for that known input. Instead, the comparison between the output of the composable asynchronous task and the reference output may be delegated to a specialized composable asynchronous task that may have been designed to determine if two structures are equivalent in meaning.

For example, a composable asynchronous task called generateCode may use an LLM to generate computer code. A composable asynchronous task called testGenerateCode may be created in order to test generateCode. The testGenerateCode task may use a set of known inputs and their corresponding reference outputs. The testGenerateCode task may call the generateCode task with these known inputs and compare the new outputs from generateCode to the reference outputs for the known inputs. To determine the equivalence of the new outputs and the reference outputs, a composable asynchronous task called compareLLMOutputs may be used to analyze the outputs and determine whether or not they are functionally equivalent.

FIG. 1 shows an example system for suitable for automation with composable asynchronous tasks according to an implementation of the disclosed subject matter. A computing device 100 may be any suitable computing device, such as, for example, a computer 20 as described in FIG. 6, or component thereof, for implementing user interest detection for content generation. The computing device 100 may include an agent LLM 110, machine learning models 120, and a storage 170. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The agent LLM 110 may be any suitable combination of hardware and software of the computing device 100 for running a large language model that may be trained to decompose a larger job provided in a prompt into a number of smaller jobs that may be handled by composable asynchronous tasks. The agent LLM 110 may, for example, select a number of composable asynchronous task that may be used to generate output that may satisfy a request provided in a prompt to the agent LLM 110, may generate input data that may be input any of the composable asynchronous tasks including prompts that may be used as input to other LLMs used by the composable asynchronous tasks, use output from composable asynchronous tasks as input to other composable asynchronous tasks, determine an order in which the composable asynchronous tasks may be executed including, for example, which composable asynchronous tasks may be executed in parallel and which may wait for output from other composable asynchronous tasks, and may return a final output that may be responsive to the request in the prompt received at the agent LLM 110.

The machine learning models 120 may be any suitable machine learning models that may be used by composable asynchronous tasks. The machine learning models 120 may include, for example, large language models, generative adversarial networks, and generative pre-trained transformers that may have been trained in any suitable manner on any suitable datasets. The machine learning models 120 may include any number of different machine learning models.

The storage 170 may be any suitable combination of hardware and software for storing data. The storage 170 may include any suitable combination of volatile and non-volatile storage hardware and may include components of the computing device 100 and hardware accessible to the computing device 100, for example, through wired and wireless direct or network connections. The storage 170 may store, for example, composable asynchronous tasks 180. The composable asynchronous tasks 180, such as, for example, composable asynchronous tasks 182, 184, 186, and 188, may be composable asynchronous tasks that may be selected by the agent LLM 110 based on the agent LLM decomposing a larger job from a prompt received at the agent LLM. The composable asynchronous tasks 180 may be self-contained, modular, and reusable, and may include well-defined input and output structures, may be generated in any suitable format using any programming language and structure and may be targeted at any suitable execution environment. The composable asynchronous tasks 180 may be executable both sequentially and in parallel, and may incorporate any suitable tools that may accept any suitable input and produce and suitable output and may include any suitable number of sub-tasks each of which may itself use any suitable tools. Tools used by the composable asynchronous tasks 180, and any sub-tasks therein, may include, for example, any of the machine learning models 120, including LLMs and other forms of machine learning models, and other programs, applications, or utilities. The composable asynchronous tasks 180 may include any number of sub-tasks, including, for example, sub-tasks, for generating potential output for the composable asynchronous task using any suitable tool, sub-tasks for validating and error-checking the potential output, sub-tasks for generating and running tests on the potential output, and sub-tasks for error recovery.

Figure 2:
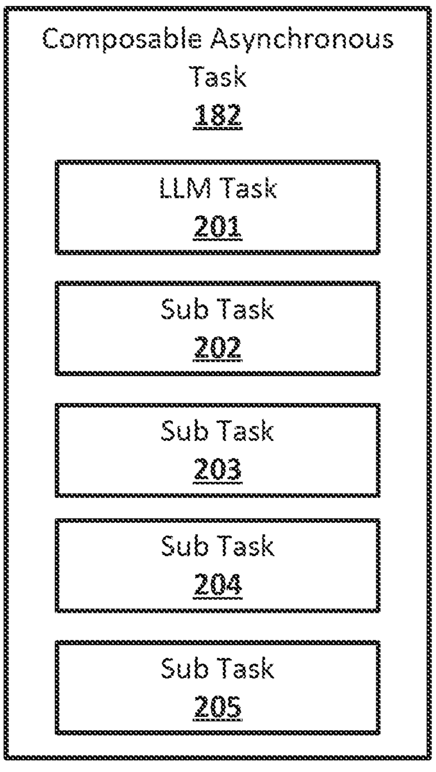
FIG. 2 shows an example arrangement suitable for automation with composable asynchronous tasks according to an implementation of the disclosed subject matter.

FIG. 2 shows an example arrangement for suitable for automation with composable asynchronous tasks according to an implementation of the disclosed subject matter. The composable asynchronous tasks 182 may receive input from an agent LLM that may be, for example, a prompt for input to an LLM that adheres to the input structure of the composable asynchronous task 182. The composable asynchronous task 182 may include, for example, an LLM task 201 and sub tasks 202, 203, 204, and 205. The LLM task 201 may, be for example, a call into a specified LLM that may be part of the machine learning models 120 that may include a prompt to be input to the specified LLM and may receive the output of the specified LLM. The specified LLM task 201 may call into the specified LLM and received the output of the specified LLM using, for an example, an API of the specified LLM. The output generated by the specified LLM after being called by the LLM task 201 may be potential output for the composable asynchronous task 182. The sub tasks 202, 203, 204, and 205 may, for example, prepare and test the potential output received from the specified LLM by the LLM task 201 to ensure that it is suitable for output by the composable asynchronous task 182. For example, if the specified LLM generated computer code, the sub tasks 202, 203, 204, and 205 may lint the computer code, generate tests for the computer code, for example, using another of the machine learning models 102, and subject the computer code to the tests to determine if it suitable to be output by the composable asynchronous task 182. If the potential output is determined to not be suitable for output from the composable asynchronous task 182, for example, due to failing a test run against it by any of the sub tasks 202, 203, 204, and 205, the composable asynchronous task 182 may be re-run to generate new potential output using, for example, additional input that may include the potential output that was deemed unsuitable and indications of the tests failed by the potential output. This may result in, for example, the LLM tasks 201 calling the specified LLM again with a new prompt that may, for example, request correction to the unsuitable potential output, or the generation of new potential output that doesn't fail the test failed by the unsuitable potential output.

FIG. 3 shows an example arrangement for suitable for automation with composable asynchronous tasks according to an implementation of the disclosed subject matter. Composable asynchronous task code 300 may be a computer code for a composable asynchronous tasks, such as any of the composable asynchronous tasks 180. The composable asynchronous task code 300 may be written in any suitable language, and may be, for example, computer code that implements a composable asynchronous task that generates computer code. A header section 301 may specify objects to be imported to and exported from the composable asynchronous task. LLM task code 302 may be code for an LLM task that takes a prompt that is received as input at the composable asynchronous task, for example, from the agent LLM 110, and uses the prompt as input to an LLM that may generate computer code based on the prompt. The LLM may be, for example, one of the machine learning models 120. Sub-task code 303 may be code for a sub-task that may lint the computer code that was generated by the LLM called by the LLM task code 302. Sub-task code 304 may be code for sub-task that may generate tests that may be used to test the computer code that was generated by the LLM called by the LLM task code 302. Return code 305 may be code that returns output from the composable asynchronous task, for example, the computer code generated by the LLM called by the LLM task code 302 after the linting of the computer code, and the test generated by the sub-task code 304. The output may be returned, for example, to the agent LLM 110 which may have executed the composable asynchronous task implemented with the composable asynchronous task code 300.

FIG. 3 shows an example arrangement for suitable for automation with composable asynchronous tasks according to an implementation of the disclosed subject matter. The user interest prediction model 110 may generate a user interest level prediction 310 for an event from the expected event data 182. The user interest level prediction 310 may show, for example, the user interest rising as the event approaches, peaking for the duration of the event, and then dropping to a negligible level at the end of the event. Based on the user interest level prediction 310, the content management system 120 may determine that content items related to the event should be displayed at various points in time as the event approaches as well as during the event, but not after the event. This determination of the content management system 120 may change as time passes and new user interest level predictions are generated for the event.

FIG. 3B shows an example arrangement for suitable for automation with composable asynchronous tasks according to an implementation of the disclosed subject matter. The user interest prediction model 110 may generate a user interest level prediction 320 for an event from the irregular event data 184. The user interest level prediction 320 may show, for example, the user interest rising rapidly as the event approaches, for example, due to the event being irregular and thus being announced as occurring relatively close to the time it actually occurs, peaking during the event, and the dropping for the remainder of the event and after the event. Based on the user interest level prediction 312, the content management system 120 may determine that content items related to the event should be displayed at various points in time as the event approaches as well as during and after the event. This determination of the content management system 120 may change as time passes and new user interest level predictions are generated for the event. The content management system 120 may also manage the display of the content items based on geospatial data for events. For example, if a holiday is only observed in a particular country, the content management system 120 may cause items displayed based a user interest level prediction for that holiday to only be displayed to users who appear to be geolocated in or near the country that observes the holiday.

Figure 4:
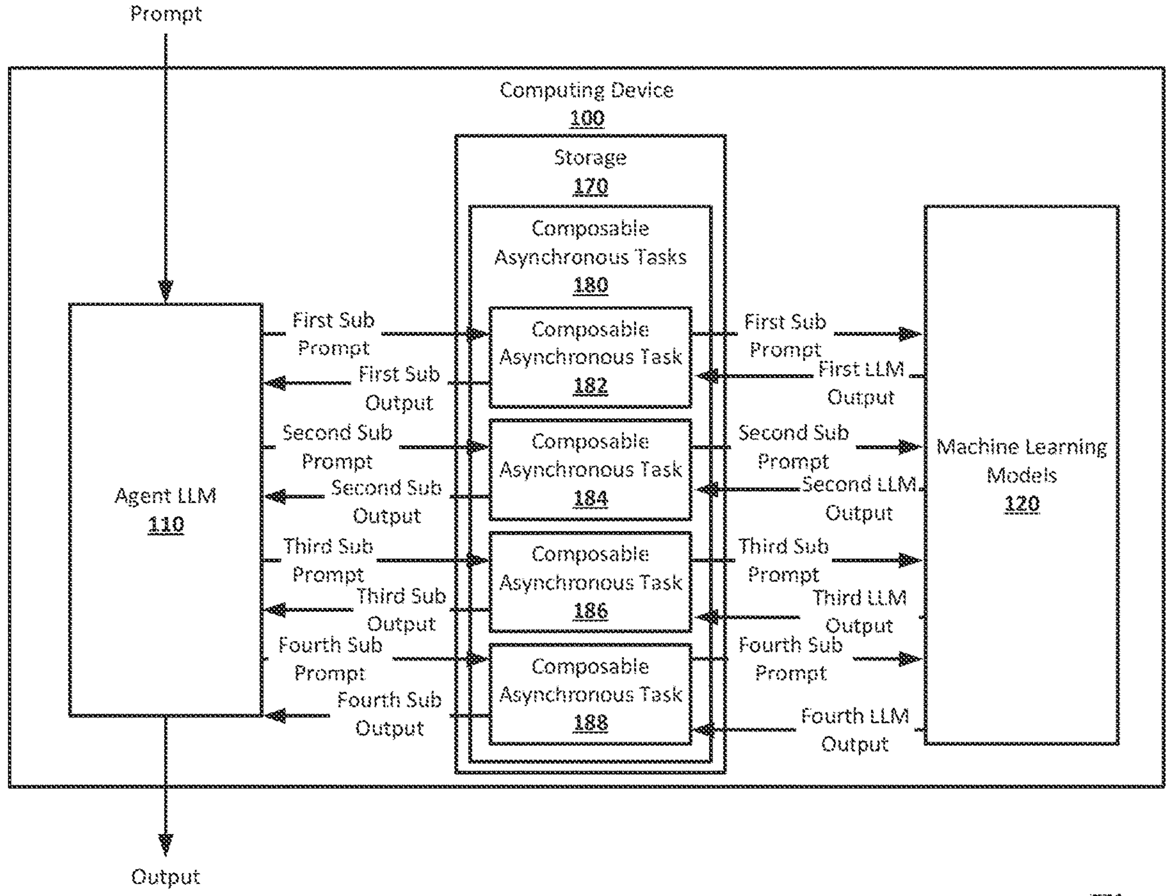
FIG. 4 shows an example arrangement suitable for automation with composable asynchronous tasks according to an implementation of the disclosed subject matter.

FIG. 4 shows an example system for suitable for automation with composable asynchronous tasks according to an implementation of the disclosed subject matter. A prompt may be received at the agent LLM 110 running on the computing device 100. The prompt may be a plain language statement that may be a request that the agent LLM perform a composable asynchronous task that will result in the generation of some desired output. The prompt may also include references to resources that may be used to generate the desired output or incorporated into the desired output, such as, for example, URLs or pointers to locally or network stored files and databases. The prompt may be received in any suitable manner from any suitable source, including, for example, from input devices attached to the computing device 100, or from other computing devices connected to the computing device 100 through any suitable connections. The prompt may also be received from, for example, another computer program running on the computing device 100 or another computing device through, for example, and API of the agent LLM 110. For example, the prompt may request the generation of a gallery user interface component for use within web applications.

The agent LLM 110 may decompose the larger job posed by the prompt into any suitable number of smaller jobs that may correspond to the capabilities of the composable asynchronous tasks 180. The agent LLM 110 may use a large language model to decompose the larger job posed in the prompt and then select appropriate composable asynchronous tasks, for example, the composable asynchronous tasks 182, 184, 186, and 188, to be used to generate output responsive the request in the prompt. The agent LLM 110 may generate a sub-prompt for each of the selected composable asynchronous tasks that uses an LLM or other generative machine learning model. Each sub-prompt may be suitable for input to an LLM or other generative machine learning model that may request the generation of output that may be used in order to generate the output requested in the prompt received at the agent LLM 110. For example, the agent LLM 110 may generate a first sub-prompt that may be input to the composable asynchronous task 182, a second sub-prompt that may be input to the composable asynchronous task 184, a third sub-prompt that may be input to the composable asynchronous task 186, and a fourth sub-prompt that may be input to the composable asynchronous task 188. The first sub-prompt may, for example, include a request to generate a gallery container component, the second sub-prompt may include a request to generate a gallery item component, the third sub-prompt may include a request to generate a gallery image component, and the fourth sub-prompt may include a request to generate the gallery user interface component from the gallery container component, the gallery item component, and the gallery image component, along with the computer code, or link or pointer to the computer code, for the gallery item component, and the gallery image component. The agent LLM may pass computer code, or any other data, generated by a composable asynchronous task into another composable asynchronous task, in any suitable manner. Sub-prompts generated by the agent LLM 110 may adhere to the defined input structures for the composable asynchronous tasks that sub-prompts will be input into.

The agent LLM 110 may execute the selected composable asynchronous tasks in any suitable order based on any dependencies between the composable asynchronous tasks in the context of the sub-prompts generated by the agent LLM 110. For example, the composable asynchronous task 188 may be dependent on the composable asynchronous tasks 182, 184, and 186 in the context of the sub-prompt that requests that the composable asynchronous task 188 generate an output, the gallery user interface component, using the outputs of the composable asynchronous tasks 182, 184, and 186. The agent LLM 110 may execute the composable asynchronous tasks 182, 184, and 186 before the composable asynchronous task 188, in parallel, and then execute the composable asynchronous task 188 once the agent LLM has received outputs from the composable asynchronous tasks 182, 184, and 186.

The agent LLM 110 may execute a composable asynchronous task inputting the sub-prompt for that composable asynchronous task into that composable asynchronous task. The agent LLM 110 may, for example, call the composable asynchronous task with the appropriate sub-prompt. The agent LLM may receive output from the composable asynchronous tasks, for example, receiving first sub-output from the composable asynchronous task 182, second sub-output from the composable asynchronous task 184, third sub-output from the composable asynchronous task 186, and fourth sub-output from the composable asynchronous task 186. The sub-outputs of the composable asynchronous tasks may be the result of the composable asynchronous tasks 182, 184, 186, and 188 sending their respective sub-prompts as inputs to suitable LLMs from the machine learning models 120, receiving from the LLMs first LLM output, second LLM output, third LLM output, and fourth LLM output, respectively. The composable asynchronous tasks 182, 184, 186, and 188, may perform any sub-tasks on the first LLM output, second LLM output, third LLM output, and fourth LLM output, for example, linting, formatting, and testing, to generate sub-outputs that may be sent back to the agent LLM 110.

For example, the agent LLM 110 may call the composable asynchronous task 182 using the first sub-prompt that requests the generation of the gallery container component, the composable asynchronous task 184 using the second sub-prompt that requests the generation of the gallery item component, and the composable asynchronous task 186 using the third sub-prompt that request the generation of the gallery image component. The composable asynchronous task 182 may, upon being called by the agent LLM with the first sub-prompt, use the first sub-prompt as input to an appropriate LLM from the machine learning models 120. The output of this LLM may be sent back to the composable asynchronous task 182 which may then perform additional tasks on the output in accordance with the sub-tasks of the composable asynchronous task 182. The output received from the LLM may be, for example, computer code for a gallery container component, and the composable asynchronous task 182 may include sub-tasks to lint the computer code, generate tests on the computer code using an LLM from the machine learning models 120, execute the tests on the computer code, and document the computer code. The composable asynchronous task 182 may also include error recovery which may cause the composable asynchronous task 182 to re-run itself with a modified version of the first sub-prompt if the computer code fails any of the tests. The composable asynchronous task 182 may output the computer code for the gallery container component back to the agent LLM 110 once the computer code has been linted and passed all tests executed on it. The composable asynchronous tasks 184 and 186 may operate similarly when called by the agent LLM 110, each using suitable LLMs from the machine learning models 120 to generate computer code responsive to the second and third sub-prompts respectively, and linting and testing this computer code before sending it as output back to the agent LLM 110. The agent LLM 110 may then execute the composable asynchronous task 188, which may receive as part of its sub-prompt the computer code for the gallery container component, gallery item component, and gallery image component. The composable asynchronous task 188 may use the sub-prompt it receives from the agent LLM 110 as input to an LLM from the machine learning models 120. This LLM may generate computer code for a gallery user interface component and send this computer code back to the composable asynchronous task 188. The composable asynchronous task 188 may execute any suitable sub-tasks on the computer code for the gallery user interface component, including, for example, linting, test generation, and test execution, before sending the computer code for the gallery user interface component back to the agent LLM 110.

Once the agent LLM 110 has executed and received sub-outputs from the all of the composable asynchronous tasks, the agent LLM 110 may generate and send a final output that may be responsive to the request in the prompt received by the agent LLM 110. The final output may use the sub-outputs received from the composable asynchronous tasks called by the agent LLM 110 in any suitable manner. For example, the agent LLM 110 may use all of the sub-outputs as part of the final output, or may, for example, use only a single sub-output if that sub-output already includes the other sub-outputs. For example, the agent LLM 110 may output the fourth sub-output received from the composable asynchronous task 188, which may be the computer code for the gallery user interface component, along with documentation for the gallery container component, gallery item component, and gallery image component received as part of the first, second, and third sub-outputs. The final output from the agent LLM 110 may be sent to any suitable destination, including, for example, destination specified in the prompt. For example, the output from the agent LLM 110 may be stored in any number of files stored in any suitable location, in a database, may be transmitted to any suitable computing device through any suitable connection using any suitable form of electronic communication, or may used as input to any suitable software program, a component of a software development pipeline, running on any suitable component device.

Figure 5:
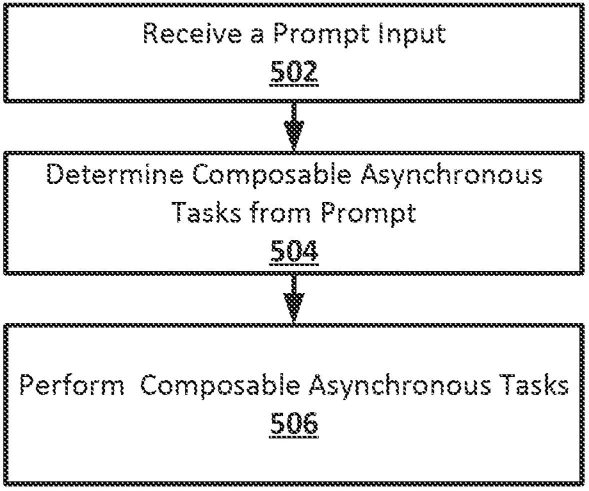
FIG. 5 shows an example procedure suitable for automation with composable asynchronous tasks according to an implementation of the disclosed subject matter.

FIG. 5 shows an example procedure suitable for automation with composable asynchronous tasks according to an implementation of the disclosed subject matter. At 502, a prompt input by a user may be received. For example, the agent LLM 110 on the computing device 100 may receive a prompt input by user that may include a request to be completed by the agent LLM 110. The prompt may also by generated by a computing device, such as the computing device 100 or another computing device, before being received at the agent LLM 110 as input.

At 504, an LLM may determine tasks from the prompt including a composable asynchronous task that uses an LLM. For example, the agent LLM 110 may decompose the prompt into tasks that may correspond to composable asynchronous tasks, such as any of the composable asynchronous tasks 180. The agent LLM 110 may use the decomposition of the prompt to determine which of the composable asynchronous tasks 180 to use to generate output that responds to the request in the prompt and may select these composable asynchronous tasks. One of the selected composable asynchronous tasks may itself use an LLM.

At 506, the composable asynchronous tasks may be performed, including generating output with an LLM, validating the output of the LLM, and generating output using the output from the LLM. For example, the agent LLM 110 may execute the composable asynchronous tasks, for example the composable asynchronous tasks 182, 184, 186, and 188, determined from the prompt and selected to generate output responsive to the request in the prompt. The composable asynchronous task 182 may use an LLM from the machine learning systems to generate output which may be validated by sub-tasks of the composable asynchronous task 182. The composable asynchronous tasks 188 may generate output that incorporate the output of the LLM used by the composable asynchronous task 182, as output by the composable asynchronous tasks 182, for example, combining the output of the composable asynchronous tasks 182 with outputs from the composable asynchronous tasks 184 and 186 to generate an output that is responsive to the request in the prompt received by the agent LLM 110.

Figures 6, 7:
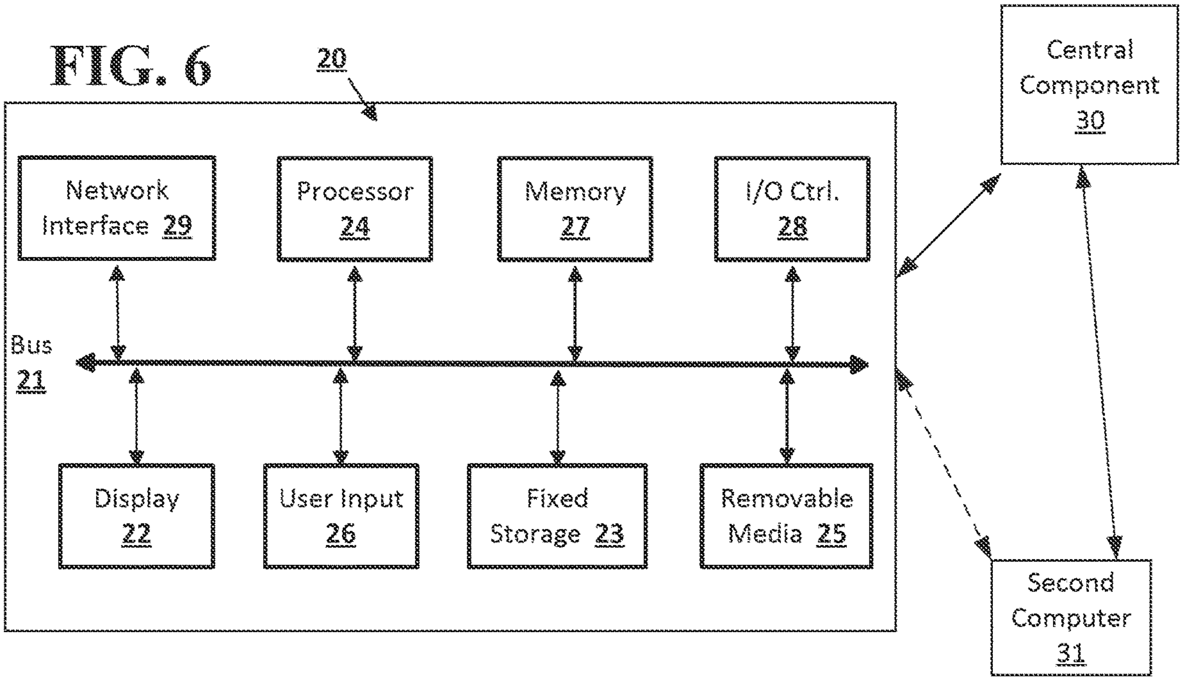
FIG. 6 shows a computer according to an implementation of the disclosed subject matter.
FIG. 7 shows a network configuration according to an implementation of the disclosed subject matter.

Implementations of the presently disclosed subject matter may be implemented in and used with a variety of component and network architectures. FIG. 6 is an example computer 20 suitable for implementing implementations of the presently disclosed subject matter. As discussed in further detail herein, the computer 20 may be a single computer in a network of multiple computers. As shown in FIG. 6, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 7.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

FIG. 7 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:

receiving, at a computing device, a prompt;

determining, by the computing device using a first large language model (LLM), from the prompt, at least two composable asynchronous tasks, wherein a first composable asynchronous task of the at least two composable asynchronous tasks uses a second LLM; and performing, by the computing device, the at least two composable asynchronous tasks, wherein performing the first composable asynchronous task of the at least two composable asynchronous tasks comprises:

generating a first output with the second LLM based on the prompt, validating the first output of the second LLM, determining that the first output of the second LLM failed a test while being validated, and correcting the first output of the second LLM, wherein performing a second composable asynchronous task of the at least two composable asynchronous tasks comprises:

generating a second output using the first output after the correcting of the first output of the second LLM, and wherein performing a third composable asynchronous task of the at least two composable asynchronous tasks comprises:

generating a third output in parallel with the performing of the first composable asynchronous task.

2. The computer-implemented method of claim 1, wherein the first output comprises computer code for a component of an application, and wherein the second output comprises the component of the application.

3. The computer-implemented method of claim 1, wherein generating the second output using the first output further comprises combining the first output with at least one additional output of at least one additional composable asynchronous task of the at least two composable asynchronous tasks.

4. The computer-implemented method of claim 1, wherein validating the first output of the second LLM comprises:

generating tests for the first output, and performing the tests on the first output.

5. The computer-implemented method of claim 4, further comprising:

determining that the first output fails at least one of the tests, and regenerating the first output with the second LLM based on the at least one of the tests failed by the first output.

6. The computer-implemented method of claim 1, wherein performing the first composable asynchronous task of the at least two composable asynchronous tasks further comprises:

generating a sub-prompt based on the prompt and the first composable asynchronous task; and inputting the sub-prompt to the first composable asynchronous task of the at least two composable asynchronous tasks.

7. The computer-implemented method of claim 1, wherein the composable asynchronous composable asynchronous task has a defined input structure and a defined output structure.

8. A computer-implemented system comprising:

a storage; and one or more processors that receive a prompt;

determine using a first large language model (LLM), from the prompt, at least two composable asynchronous tasks, wherein a first composable asynchronous task of the at least two composable asynchronous tasks uses a second LLM; and perform the at least two composable asynchronous tasks, wherein the first composable asynchronous task of the at least two composable asynchronous tasks is performed by:

generating a first output with the second LLM based on the prompt, validating the first output of the second LLM, determining that the first output of the second LLM failed a test while being validated, and correcting the first output of the second LLM, and wherein performing a second composable asynchronous task of the at least two composable asynchronous tasks comprises:

generating a second output using the first output after the correcting of the first output of the second LLM, and wherein performing a third composable asynchronous task of the at least two composable asynchronous tasks comprises:

generating a third output in parallel with the performing of the first composable asynchronous task.

9. The computer-implemented system of claim 8, wherein the first output comprises computer code for a component of an application, and wherein the second output comprises the component of the application.

10. The computer-implemented system of claim 8, wherein the one or more processors generate the second output using the first output further by combining the first output with at least one additional output of at least one additional composable asynchronous task of the at least two composable asynchronous tasks.

11. The computer-implemented system of claim 8, wherein the one or more processors validate the first output of the second LLM by generating tests for the first output and performing the tests on the first output.

12. The computer-implemented system of claim 11, wherein the one or more processors further determine that the first output fails at least one of the tests, and regenerate the first output with the second LLM based on the at least one of the tests failed by the first output.

13. The computer-implemented system of claim 8, wherein the one or more processors wherein perform the first composable asynchronous task of the at least two composable asynchronous tasks by generating a sub-prompt based on the prompt and the first composable asynchronous task and inputting the sub-prompt to the first composable asynchronous task of the at least two composable asynchronous tasks.

14. The computer-implemented system of claim 8, wherein the composable asynchronous composable asynchronous task has a defined input structure and a defined output structure.

15. A system comprising: one or more computers and one or more non-transitory storage devices storing instructions which are operable, when executed by the one or more computers, to cause the one or more computers to perform operations comprising:

receiving, at a computing device, a prompt;

determining, by the computing device using a first large language model (LLM), from the prompt, at least two composable asynchronous tasks, wherein a first composable asynchronous task of the at least two composable asynchronous tasks uses a second LLM; and performing, by the computing device, the at least two composable asynchronous tasks, wherein performing the first composable asynchronous task of the at least two composable asynchronous tasks comprises:

generating a first output with the second LLM based on the prompt, validating the first output of the second LLM, determining that the first output of the second LLM failed a test while being validated, and correcting the first output of the second LLM, wherein performing a second composable asynchronous task of the at least two composable asynchronous tasks comprises:

generating a second output using the first output after the correcting of the first output of the second LLM, and wherein performing a third composable asynchronous task of the at least two composable asynchronous tasks comprises:

generating a third output in parallel with the performing of the first composable asynchronous task.

16. The system of claim 15, wherein the first output comprises computer code for a component of an application, and wherein the second output comprises the component of the application.

17. The system of claim 15 wherein the instructions which are operable, when executed by the one or more computers, to cause the one or more computers to perform the operation comprising generating the second output using the first output further cause the one or more computers to further perform operations comprising:

combining the first output with at least one additional output of at least one additional composable asynchronous task of the at least two composable asynchronous tasks.

18. The system of claim 15, wherein the instructions which are operable, when executed by the one or more computers, to cause the one or more computers to perform the operation comprising validating the first output of the second LLM further cause the one or more computers to further perform operations comprising:

generating tests for the first output, and performing the tests on the first output.

19. The system of claim 18, wherein the one or more computers and one or more non-transitory storage devices further store instructions which are operable, when executed by the one or more computers, to cause the one or more computers to further perform operations comprising:

determining that the first output fails at least one of the tests, and regenerating the first output with the second LLM based on the at least one of the tests failed by the first output.

20. The system of claim 15, wherein the instructions which are operable, when executed by the one or more computers, to cause the one or more computers to perform the operation comprising performing the first composable asynchronous task of the at least two composable asynchronous tasks further cause the one or more computers to further perform operations comprising:

generating a sub-prompt based on the prompt and the first composable asynchronous task; and inputting the sub-prompt to the first composable asynchronous task of the at least two composable asynchronous tasks.

* * * * *